United States Patent
Jeong et al.

(10) Patent No.: US 12,532,372 B2
(45) Date of Patent: *Jan. 20, 2026

(54) METHOD FOR CONTROLLING SERVICE IN RADIO COMMUNICATION SYSTEM

(71) Applicant: Samsung Electronics Co., Ltd., Suwon-si (KR)

(72) Inventors: Sang Soo Jeong, Suwon-si (KR); Song Yean Cho, Seoul (KR); Young Kyo Baek, Seoul (KR); Sung Hwan Won, Seoul (KR); Han Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

This patent is subject to a terminal disclaimer.

(21) Appl. No.: 18/317,559

(22) Filed: May 15, 2023

(65) Prior Publication Data

US 2023/0284087 A1 Sep. 7, 2023

Related U.S. Application Data

(63) Continuation of application No. 17/360,904, filed on Jun. 28, 2021, now Pat. No. 11,653,259, which is a
(Continued)

(51) Int. Cl.
*H04W 28/02* (2009.01)
*H04W 36/00* (2009.01)
(Continued)

(52) U.S. Cl.
CPC ....... *H04W 76/18* (2018.02); *H04W 36/0079* (2018.08); *H04W 36/12* (2013.01);
(Continued)

(58) Field of Classification Search
CPC . H04W 76/18; H04W 36/0079; H04W 36/12; H04W 76/34; H04W 76/50;
(Continued)

(56) References Cited

U.S. PATENT DOCUMENTS 6,091,953 A 7/2000 Ho et al.
6,311,055 B1 10/2001 Boltz
(Continued)

FOREIGN PATENT DOCUMENTS

CN 1220799 A 6/1999
CN 1878345 A 12/2006
(Continued)

OTHER PUBLICATIONS

Communication from a foreign patent office in a counterpart foreign application, "Text of the First Office Action," Chinese Application No. 201380012408.4, dated Jul. 13, 2017, 17 pages.
(Continued)

*Primary Examiner* — Eunsook Choi

(57) ABSTRACT

In a user equipment of a wireless communication system, a method for signal transmission and reception may include: sending a request for a Circuit Switched voice network (CS) service to a Gateway Mobile Switching Center (GMSC) to send and receive data to and from a second user equipment; and receiving a call reject response corresponding to the service request from the GMSC, wherein the call reject response is sent by an entity in a core network of the second user equipment. According to an embodiment, it is possible to provide a suitable service to a sender terminal making a CS service request to a receiver terminal having subscribed only to a PS service without increasing network load.

12 Claims, 12 Drawing Sheets

Related U.S. Application Data continuation of application No. 16/557,741, filed on Aug. 30, 2019, now Pat. No. 11,051,361, which is a continuation of application No. 15/489,610, filed on Apr. 17, 2017, now Pat. No. 10,405,227, which is a continuation of application No. 14/383,889, filed as application No. PCT/KR2013/001892 on Mar. 8, 2013, now Pat. No. 9,629,021.

(60) Provisional application No. 61/614,470, filed on Mar. 22, 2012, provisional application No. 61/612,484, filed on Mar. 19, 2012, provisional application No. 61/608,580, filed on Mar. 8, 2012.

(51) Int. Cl.
| | |
|---|---|
| *H04W 36/12* | (2009.01) |
| *H04W 76/18* | (2018.01) |
| *H04W 76/34* | (2018.01) |
| *H04W 76/50* | (2018.01) |
| *H04W 80/04* | (2009.01) |
| *H04W 8/02* | (2009.01) |
| *H04W 8/06* | (2009.01) |
| *H04W 8/08* | (2009.01) |

(52) U.S. Cl.
CPC ......... *H04W 76/34* (2018.02); *H04W 76/50* (2018.02); *H04W 80/04* (2013.01); *H04W 8/02* (2013.01); *H04W 8/065* (2013.01); *H04W 8/082* (2013.01); *H04W 28/0289* (2013.01)

(58) Field of Classification Search
CPC ....... H04W 80/04; H04W 8/02; H04W 8/065; H04W 8/082; H04W 28/0289; H04W 76/27; H04W 60/00; H04W 68/02; H04W 76/11
See application file for complete search history.

(56) References Cited

U.S. PATENT DOCUMENTS

| | | | |
|---|---|---|---|
| 6,370,232 B1 | 4/2002 | Yrjana | |
| 6,466,786 B1 | 10/2002 | Wallenius | |
| 7,415,274 B2 | 8/2008 | Kauranen et al. | |
| 7,633,909 B1 | 12/2009 | Jones et al. | |
| 8,682,322 B2 | 3/2014 | Wallis et al. | |
| 8,761,715 B2* | 6/2014 | Tiwari | H04W 76/34 455/450 |
| 8,855,594 B2* | 10/2014 | Suh | H04W 60/04 379/46 |
| 8,879,419 B2 | 11/2014 | Roberts et al. | |
| 8,977,227 B2 | 3/2015 | Tiwari | |
| 9,264,945 B2 | 2/2016 | Ramachandran et al. | |
| 2003/0045272 A1 | 3/2003 | Burr | |
| 2004/0029576 A1 | 2/2004 | Flykt et al. | |
| 2004/0071164 A1 | 4/2004 | Baum | |
| 2004/0095932 A1 | 5/2004 | Astarabadi et al. | |
| 2004/0116140 A1 | 6/2004 | Babbar et al. | |
| 2004/0120286 A1 | 6/2004 | Schwarz | |
| 2004/0185845 A1 | 9/2004 | Abhishek et al. | |
| 2004/0203736 A1 | 10/2004 | Serna | |
| 2006/0116151 A1 | 6/2006 | Sullivan et al. | |
| 2006/0209891 A1 | 9/2006 | Yamada et al. | |
| 2006/0277406 A1 | 12/2006 | Hashimoto et al. | |
| 2007/0197212 A1 | 8/2007 | Marsico et al. | |
| 2008/0039104 A1 | 2/2008 | Gu et al. | |
| 2008/0091766 A1 | 4/2008 | Briscoe et al. | |
| 2008/0248747 A1 | 10/2008 | Buckley | |
| 2009/0041033 A1 | 2/2009 | Marucheck et al. | |
| 2009/0232130 A1 | 9/2009 | Philavong | |
| 2010/0067434 A1 | 3/2010 | Siu et al. | |
| 2010/0081444 A1 | 4/2010 | Jin et al. | |
| 2010/0120432 A1 | 5/2010 | Watfa et al. | |
| 2010/0272025 A1 | 10/2010 | Yu | |
| 2010/0303012 A1 | 12/2010 | Atarius et al. | |
| 2010/0317315 A1 | 12/2010 | Burbidge et al. | |
| 2011/0002327 A1* | 1/2011 | Dwyer | H04W 48/18 370/352 |
| 2011/0103277 A1* | 5/2011 | Watfa | H04W 36/0033 370/310 |
| 2011/0142047 A1 | 6/2011 | Choi | |
| 2011/0182270 A1 | 7/2011 | Shaheen et al. | |
| 2011/0194505 A1 | 8/2011 | Faccin et al. | |
| 2011/0216744 A1 | 9/2011 | Taaghol et al. | |
| 2011/0222523 A1 | 9/2011 | Fu et al. | |
| 2011/0235569 A1 | 9/2011 | Huang et al. | |
| 2011/0244859 A1 | 10/2011 | Tsuda | |
| 2011/0249624 A1 | 10/2011 | Ramachandran et al. | |
| 2011/0261695 A1 | 10/2011 | Zhao et al. | |
| 2011/0299429 A1* | 12/2011 | Tiwari | H04W 76/50 370/328 |
| 2011/0299491 A1 | 12/2011 | Jang et al. | |
| 2011/0312313 A1 | 12/2011 | Hiraga et al. | |
| 2012/0034898 A1* | 2/2012 | Tiwari | H04W 4/90 455/404.1 |
| 2012/0051216 A1 | 3/2012 | Zhang et al. | |
| 2012/0083238 A1* | 4/2012 | Tiwari | H04W 60/06 455/404.1 |
| 2012/0189016 A1* | 7/2012 | Bakker | H04W 76/11 370/401 |
| 2012/0238236 A1* | 9/2012 | Liao | H04W 76/50 455/404.2 |
| 2012/0314569 A1* | 12/2012 | Liu | H04W 36/304 370/252 |
| 2013/0029631 A1* | 1/2013 | Tiwari | H04W 4/90 455/404.1 |
| 2013/0051228 A1 | 2/2013 | Kim et al. | |
| 2013/0102351 A1* | 4/2013 | Mo | H04L 65/4061 455/518 |
| 2013/0122904 A1 | 5/2013 | Lee et al. | |
| 2013/0130681 A1 | 5/2013 | Lee et al. | |
| 2013/0136114 A1* | 5/2013 | Hietalahti | H04W 4/90 455/521 |
| 2013/0143610 A1 | 6/2013 | Jeong et al. | |
| 2013/0182607 A1* | 7/2013 | Kim | H04W 4/70 370/254 |
| 2013/0201824 A1 | 8/2013 | Venkatachalam et al. | |
| 2013/0308527 A1* | 11/2013 | Chin | H04W 36/00224 370/328 |
| 2014/0146783 A1 | 5/2014 | Kim et al. | |
| 2014/0219248 A1 | 8/2014 | Reddiboyana et al. | |
| 2014/0293793 A1 | 10/2014 | Racz et al. | |

FOREIGN PATENT DOCUMENTS

| | | |
|---|---|---|
| CN | 101026824 A | 8/2007 |
| CN | 101212483 A | 7/2008 |
| CN | 101540979 A | 9/2009 |
| CN | 101563950 A | 10/2009 |
| CN | 101877842 A | 11/2010 |
| CN | 101998357 A | 3/2011 |
| EP | 1400138 B1 | 3/2009 |
| EP | 2083599 A2 | 7/2009 |
| EP | 2385721 A1 | 11/2011 |
| EP | 2731373 A1 | 5/2014 |
| JP | 2009514348 A | 4/2009 |
| JP | 2010154079 A | 7/2010 |
| JP | 2010268249 A | 11/2010 |
| JP | 2011217058 A | 10/2011 |
| KR | 10-2004-0034712 A | 4/2004 |
| KR | 10-0767875 B1 | 10/2007 |
| KR | 10-2008-0098313 A | 11/2008 |
| KR | 10-2009-0076467 A | 7/2009 |
| KR | 10-2010-0049320 A | 5/2010 |
| KR | 10-2012-0006659 A | 1/2012 |
| KR | 10-2012-0011012 A | 2/2012 |
| WO | 9918704 A2 | 4/1999 |
| WO | 2007076410 A2 | 7/2007 |
| WO | 2009151452 A1 | 12/2009 |
| WO | 2010037053 A1 | 4/2010 |
| WO | 2011047716 A1 | 4/2011 |

(56) References Cited

FOREIGN PATENT DOCUMENTS

| WO | 2011141154 A1 | 11/2011 |
|---|---|---|
| WO | 2012011787 A2 | 1/2012 |
| WO | 2012011788 A2 | 1/2012 |
| WO | 2013080125 A1 | 6/2013 |

OTHER PUBLICATIONS

Communication from a foreign patent office in a counterpart foreign application, "Notice of Reasons for Refusal," Japanese Application No. 2014-560858, dated May 8, 2017, 9 pages.
Communication from a foreign patent office in a counterpart foreign application, "The Second Office Action," Chinese Application No. CN 201380012408.4, dated Feb. 8, 2018, 27 pages.
Communication from a foreign patent office in a counterpart foreign application, "Reexamination Report," Japanese Application No. JP 2014-560858, dated Feb. 6, 2018, 4 pages.
Motorola, "Correction to the SMS paging procedure," C1-094931 (rev of C1-094204, C1-094493, C1-094756, C1-094808), 3GPP TSG-CT WG1 Meeting #62, Beijing (P.R. China), Nov. 9-13, 2009, 2 pages.
Qualcomm Incorporated, "Corrections related to use of location area identifier IE at MME upon receiving SGsAP-Paging-Request message," C1-103430, 3GPP TSG-CT WG1 Meeting #66, Xi'an (P.R. China), Aug. 23-27, 2010, 3 pages.
Qualcomm Europe, "PS Bearer handling in redirection/NACC/CCO based CSFB," TD S2-097060, 3GPP TSG SA WG2 Meeting #76, San Jose Del Cabo, Mexico, Nov. 16-20, 2009, 9 pages.
Samsung, "Filtering CS paging without SMS indicator for SMS only UE," S2-095346, 3GPP TSG-SA WG2 Meeting #75, Kyoto, Japan, Aug. 31-Sep. 4, 2009, 7 pages.
Cable Television Laboratories, Inc., "Security Technical Report", 42 pages.
T-Mobile, Orange, "S1-U TNL congestion indication", 3GPP TSG-RAN WG3 Meeting #59bis, Mar. 31-Apr. 3, 3 pages, R3-080861.
"3rd Generation Partnership Project; Technical Specification Group Core Network and Terminals; Basic call handling; Technical realization (Release 11)", 3GPP TS 23.018 v11.1.0, (Dec. 2011), 7 pages.
"3rd Generation Partnership Project; Technical Specification Group Core Network and Terminals; Mobile radio interface Layer 3 specification; Core network protocols; Stage 3 (Release 11)", 3GPP TS 24.008 v11.1.2, (Jan. 2012), 5 pages.
"3rd Generation Partnership Project; Technical Specification Group Core Network and Terminals; Mobility Management Entity (MME)—Visitor Location Register (VLR) SGs interface specification (Release 11)", 3GPP TS 29.118 v11.1.0, (Dec. 2011), 62 pages.
Notice of Reasons for Refusal dated Mar. 11, 2019 in connection with Japanese Patent Application No. 2017-254115, 11 pages.
Trial Decision dated Mar. 25, 2019 in connection with Japanese Patent Application No. 2014-560858, 39 pages.
Office Action dated Feb. 11, 2019 in connection with Korea Patent Application No. 10-2013-0025088, 10 pages.
Office Action dated Jan. 8, 2019 in connection with Korea Patent Application No. 10-2013-0028880, 10 pages.
Office Action dated Feb. 15, 2019 in connection with Korea Patent Application No. 10-2013-0029277, 14 pages.
European Patent Office, "European Search Report," Application No. EP 19158736.9, dated Jun. 12, 2019, 10 pages.
Renesas Mobile Europe, "PDP context and EPS bearer context for emergency call," C1-120545, 3GPP TSG CT WG1 Meeting #76, Xiamen, China, Feb. 6-10, 2012, 5 pages.
Communication Pursuant to Rule 164(1) EPC dated Nov. 15, 2015 in connection with European Patent Application No. 1375809.3; 7 pages.
3GPP TS 23.015; "Technical Realization of Operator Determined Barring (ODB) (Release 10)"; Tech. Spec. Group Core Network Terminals; V10.0.0; Dec. 2010; 30 pages.
International Search Report dated Jun. 19, 2013 in connection with International Patent Application No. PCT/KR2013/001892, 7 pages.
Written Opinion of International Searching Authority dated Jun. 19, 2013 in connection with International Patent Application No. PCT/KR2013/001892, 7 pages.
3GPP TS 23.401 v10.5.0 Release 10, "LTE; General Packet Radio Service (GPRS) Enhancements for Evolved Universal Terrestrial Radio Access Network (E-UTRAN) Access", Oct. 2011, 284 pages.
European Examination Report dated Dec. 20, 2016 in connection with European Application No. 13758097.3, 7 pages.
Japanese Office Action dated Dec. 26, 2016 in connection with Japanese Application No. 2014-560858, 12 pages.
Alcatel-Lucent, "Originating & Terminating Network Information Flows", 3GPP TSG CT WG4 Meeting #54bis, C4-112274, Hyderabad, India, Oct. 10-14, 2011, 4 pages.
Decision of Patent in connection with Korean Application No. 10-2013-0024980 dated Mar. 30, 2020, 8 pages.
ETSI TS 123 401 V8.14.0 (Jun. 2011), Technical Specification, LTE; General Packet Radio Service (GPRS) enhancements for Evolved Universal Terrestrial Radio Access Network (E-UTRAN) access (3GPP TS 23.401 version 8.14.0 Release 8), Jun. 2011, 244 pages.
Communication pursuant to Article 94(3) EPC dated Aug. 20, 2020 in connection with European Patent Application No. 19 158 736.9, 5 pages.
HTC, "Handling of an emergency EPS context when user plane radio bearer can not be established", Change Request, 3GPP TSG-CT WG1 Meeting #66, Aug. 23-27, 2010, C1-102961, 3 pages.
Decision of Patent dated Mar. 29, 20201 in connection with Korean Application No. 10-2020-0080047, 5 pages.
NEC, "Local ISR deactivation in the UE upon change of the UE's usage setting or the voice domain preference for E-UTRAN," C1-120266, 3GPP TSG CT WG1 Meeting #76, Xiamen, China, Feb. 6-10, 2012, 6 pages.
NTT Docomo, et al., "Re-attach for emergency bearer service," C1-120809, 3GPP TSG CT WG1 Meeting #76, Xiamen, China, Feb. 6-10, 2012, 16 pages.
NTT Docomo, et al., "Re-attach emergency bearer service," C1-120119, 3GPP TSG CT WG1 Meeting #76, Xiamen, China, Feb. 6-10, 2012, 15 pages.
NTT Docomo, "Clarification of ISR activation condition for Periodic RAU," C1-120139, 3GPP TSG CT WG1 Meeting #76, Xiamen, China, Feb. 6-10, 2012, 6 pages.
NTT Docomo, et al., "Re-attach emergency bearer service," C1-120503, 3GPP TSG CT WG1 Meeting #76, Xiamen, China, Feb. 6-10, 2012, 16 pages.
NTT Docomo, et al., "Re-attach emergency bearer service," C1-120810, 3GPP TSG CT WG1 Meeting #76, Xiamen, China, Feb. 6-10, 2012, 17 pages.
ZTE, "Emergency bearer services for low priority UEs," C1-110416, 3GPP TSG-CT WG1 Meeting #69, Ljubljana, Slovenia, Jan. 24-28, 2011, 7 pages.
The Second Office Action dated May 8, 2021 in connection with Chinese Application No. 201910122894.4, 19 pages.
European Search Report dated Sep. 13, 2021, in connection with European Application No. 21179267.6, 10 pages.
3GPP TS 24.623 V10.2.0 (Dec. 2011), Technical Specification, 3rd Generation Partnership Project; Technical Specification Group Core Network and Terminals; Extensible Markup Language (XML) Configuration Access Protocol (XCAP) over the Ut interface for Manipulating Supplementary Services (Release 10), Dec. 2011, 18 pages.
PacketCable 2.0, Security Technical Report, PKT-TR-SEC-V02-061013, Oct. 13, 2006, 43 pages.
Rosenberg, et al., "A Framework for Consent-Based Communications in the Session Initiation Protocol (SIP)", SIPPING Internet-Draft, Oct. 18, 2004, 18 pages.
T-Mobile, et al., "S1-U TNL congestion indication," R3-080861, 3GPP TSG-RAN WG3 Meeting #59bis, Shenzhen (China), Mar. 31-Apr. 3, 2008, 4 pages.
Reexamination Notification dated Oct. 9, 2022, in connection with Chinese Patent Application No. 201910122894.4, 16 pages.

(56) References Cited

OTHER PUBLICATIONS

Decision of Reexamination dated Nov. 29, 2022, in connection with Chinese Patent Application No. 201910122894.4.4, 26 pages.

* cited by examiner

METHOD FOR CONTROLLING SERVICE IN RADIO COMMUNICATION SYSTEM

CROSS-REFERENCE TO RELATED APPLICATIONS

This application is continuation of application Ser. No. 17/360,904, filed Jun. 28, 2021, now U.S. Pat. No. 11,653,259, which is a continuation of application Ser. No. 16/557,741, filed Aug. 30, 2019, now U.S. Pat. No. 11,051,361, which is a continuation of application Ser. No. 15/489,610, filed Apr. 17, 2017, now U.S. Pat. No. 10,405,227, which is a continuation of application Ser. No. 14/383,889, now U.S. Pat. No. 9,629,021, which is the National Stage of International Application No. PCT/KR2013/001892, filed Mar. 8, 2013, which claims the benefit of Provisional Application No. 61/614,470, filed Mar. 22, 2012, Provisional Application No. 61/612,484, filed Mar. 19, 2012, and Provisional Application No. 61/608,580, filed Mar. 8, 2012, the disclosures of which are herein incorporated by reference in their entirety.

BACKGROUND

1. Field

The present disclosure relates to a method and apparatus that control communication services in a wireless communication system without increasing network load.

2. Description of Related Art

FIG. 1 illustrates an architecture of the LTE mobile communication system.

As shown in FIG. 1, the radio access network (EUTRAN) of the LTE mobile communication system is composed of an evolved base station (Evolved Node B, ENB or Node B) 105, Mobility Management Entity (MME) 110, and Serving Gateway (S-GW) 115. A user equipment (UE or terminal) 100 may connect to an external network through the ENB 110, S-GW 115 and PDN Gateway (P-GW) 120.

Application Function (AF) 130 is an entity that provides session related information to user applications.

The PCRF 125 is an entity for controlling policies related to user QoS. Policy and charging control (PCC) rules corresponding to a specific policy are sent to the P-GW 120 for enforcement.

The ENB 105 is a radio access network (RAN) node, which corresponds to the RNC of the UTRAN system or the BSC of the GERAN system. The ENB 105 is connected with the UE 100 through a wireless channel and functions similarly to the existing RNC or BSC.

In the LTE system, as all user traffic including real-time services like VoIP (Voice over IP) services is served by shared channels, it is necessary to perform scheduling on the basis of status information collected from UEs 100. The ENB 105 performs this scheduling function.

The S-GW 115 provides data bearers, and creates and removes a data bearer under control of the MME 110.

The MME 110 performs various control functions, and may be connected to multiple base stations.

Policy Charging and Rules Function (PCRF) 125 is an entity performing overall QoS and charging control functions for traffic.

For service provisioning in a wireless communication system described above, it is necessary to develop a method and apparatus that can provide services without increasing network load.

SUMMARY

Aspects of the present disclosure are to address the above mentioned problems. Accordingly, an aspect of the present disclosure is to provide a method and apparatus that can generate, when a request for a circuit switched voice network (CS) service is issued to a user having subscribed only to a packet switched data network (PS) service, a service restriction notification without increasing network load.

Another aspect of the present disclosure is to provide a method and apparatus that enable, when a need for an emergency call is generated in a user equipment handling a normal call, the user equipment to place an emergency call under required conditions without increasing network load.

Another aspect of the present disclosure is to provide a method and apparatus that can adjust, when the network is congested, services without aggravating network congestion.

In accordance with an aspect of the present disclosure, a method for signal transmission and reception in a user equipment of a wireless communication system is provided. The method may include: sending a request for a Circuit Switched voice network (CS) service to a Gateway Mobile Switching Center (GMSC) to send and receive data to and from a second user equipment; and receiving a call reject response corresponding to the service request from the GMSC, wherein the call reject response is sent by an entity in a core network of the second user equipment.

In accordance with another aspect of the present disclosure, a method for congestion control in a user equipment of a wireless communication system is provided. The method may include: sending a Non-Access-Stratum (NAS) request to a base station; receiving a NAS reject response corresponding to the request from a core network; and sending a Radio Resource Control (RRC) connection setup signal containing an indicator indicating necessity of release of an RRC connection between the user equipment and base station to the base station.

In accordance with another aspect of the present disclosure, a user equipment in a wireless communication system is provided. The user equipment may include: a transceiver unit to send a request for a Circuit Switched voice network (CS) service to a Gateway Mobile Switching Center (GMSC) to send and receive data to and from a second user equipment; and a control unit to control the transceiver unit to receive a call reject response corresponding to the service request from the GMSC, wherein the call reject response is sent by an entity in a core network of the second user equipment.

In accordance with another aspect of the present disclosure, a user equipment supporting congestion control is provided. The user equipment may include: a transceiver unit to send a Non-Access-Stratum (NAS) request to a base station and to receive a NAS reject response due to congestion, corresponding to the request, from a core network; and a control unit to control the transceiver unit to send a Radio Resource Control (RRC) connection setup signal containing an indicator indicating necessity of release of an RRC connection between the user equipment and base station to the base station.

According to one embodiment, it is possible to provide a suitable service to a sender terminal making a CS service request to a receiver terminal having subscribed only to a PS service without increasing network load.

According to another embodiment, even when a need for an emergency call is generated in a user equipment engaged in a normal call, it is possible to provide a service satisfying emergency call requirements.

According to another embodiment, when the network is congested, it is possible to provide services with reduced network load for congestion resolution.

DETAILED DESCRIPTION

Figure 1:
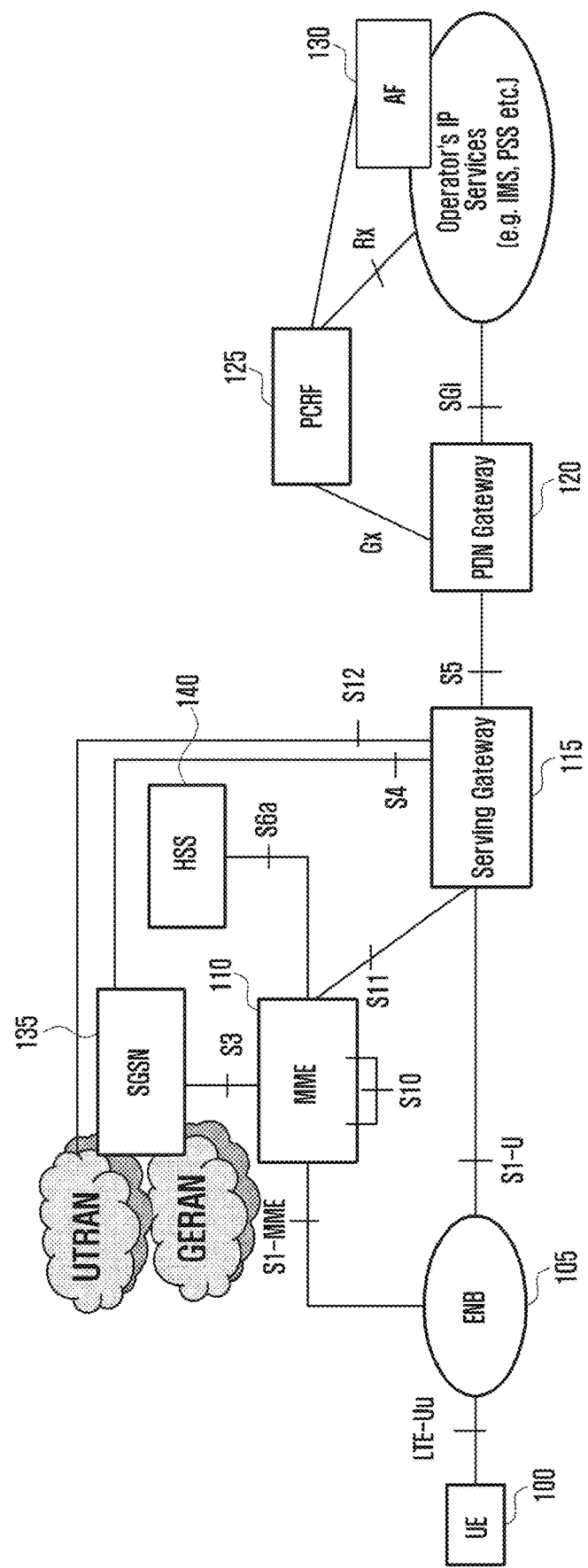
FIG. 1 illustrates an architecture of the LTE mobile communication system.

In the following description of embodiments of the present disclosure, detailed descriptions of well-known functions and structures incorporated herein may be omitted to avoid obscuring the subject matter of the present disclosure.

In the drawings, some elements are exaggerated, omitted, or outlined in brief, and thus may be not drawn to scale. The same reference symbols are used throughout the drawings to refer to the same or like parts.

The following description of embodiments of the present disclosure is focused on Third Generation Partnership Project (3GPP) LTE systems. However, it should be apparent to those skilled in the art that the subject matter of the present disclosure is also applicable to other communication/computer systems having a similar technical basis and system configuration without significant modification. For example, the description related to the LTE system may be applied to the UTRAN/GERAN system having similar system architecture. In this case, the ENB (RAN node) may be replaced with the RNC/BSC, the MME may be replaced with the SGSN, the S-GW may be omitted or be included in the SGSN, and the P-GW may correspond to the GGSN. Bearers in the LTE system may correspond to PDP context in the UTRAN/GERAN system. In various embodiments, each communication entity may include a transceiver unit to exchange signals with another entity, and a control unit to control the transceiver unit and perform operations on the basis of signals exchanged through the transceiver unit. In various embodiments, a user equipment may include a display unit to present a visual signal to a user.

First Embodiment

In most cases, users wishing to receive wireless communication services subscribe to both circuit switched voice network (CS) services and packet switched data network (PS) services.

In one embodiment, it may be assumed that a particular user has a subscription to only a PS service. A user having only a PS service subscription may receive an SMS service but may be not allowed to receive a CS service without a separate measure. That is, it may be assumed that a particular user is allowed to receive a PS data service and SMS service but is not allowed to receive a CS service such as a voice call (such a user is referred to as a PS-only-with-SMS user).

When a user equipment for a PS-only-with-SMS user is registered with an operator network, the operator network may provide a data service and SMS service to the PS-only-with-SMS user. In this case, a mobile terminating CS service request (e.g. a voice call) may be issued to the PS-only-with-SMS user. For example, a random call for advertisement or promotion may be placed without consideration of a recipient phone number. A voice call may be wrongly placed to a phone number that had been previously assigned to a voice call subscriber and has been reassigned to a PS-only-with-SMS subscriber.

As such, when a mobile terminating CS service request (voice call) is issued to a PS-only-with-SMS user, the network may have to perform signaling such as subscriber location identification and paging. However, as the PS-only-with-SMS user cannot receive a CS service like a voice call, such a signaling procedure is useless but merely increases network load.

To solve the above problem, a procedure is proposed as follows. When a mobile terminating CS service request is issued to a recipient having registered as a PS-only-with-SMS user, the operator network may determine that the user equipment is detached from a CS service (i.e. reject voice call or disallow CS service). More specifically, the following schemes may be used.

Figure 2:
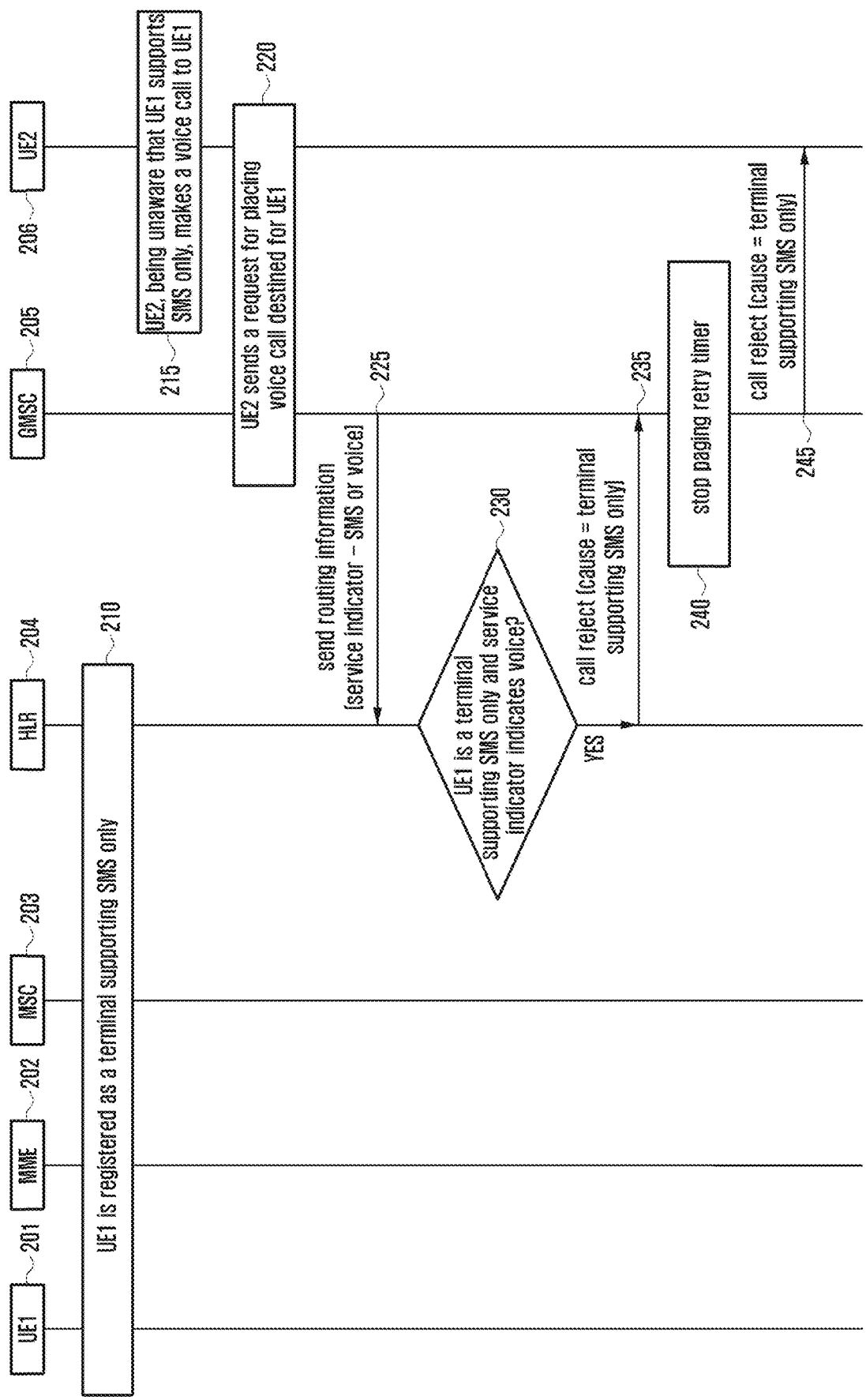
FIG. 2 illustrates a procedure for signal exchange according to a first embodiment.

FIG. 2 illustrates a procedure for signal exchange according to the first embodiment, wherein Home Location Register (HLR) is responsible for determination.

At operation 210, a first user equipment (UE1) 201 is registered as a PS-only-with-SMS terminal in at least one of the MME 202, MSC 203 and HLR 204. Here, the UE1 201 registered as a PS-only-with-SMS terminal may receive only a PS data service or a SMS service. PS-only-with-SMS may be given to a user equipment not allowed to receive a CS service.

At operation 215, a second user equipment (UE2) 206, being unaware that the UE1 201 is a PS-only-with-SMS terminal, makes a voice call to the UE1 201. Here, in addition to a voice call, a request for any CS service may be issued.

At operation 220, the UE2 206 sends a request for placing a voice call destined for the UE1 201 to Gateway Mobile Switching Center (GMSC) 205.

Upon reception of the voice call request, at operation 225, to find an MSC/VLR at which the corresponding subscriber is located, the GMSC 205 transmits a Send Routing Information (SRI) Request message to the HLR 204. This message may include a service indicator indicating the requested service (voice call or SMS, or CS service other than SMS).

At operation 230, the HLR 204 checks whether the request destined for the UE1 201 is SMS according to UE registration information and examines subscription information of the UE1 201. If the request destined for the UE1 201 is SMS, the HLR 204 may forward the request to the MSC 203 in which the UE1 201 is registered.

If the request destined for the UE1 201 is non-SMS (CS service or voice call), the HLR 204 may regard the UE1 201 as being detached from the requested service.

To this end, at operation 235, the HLR 204 sends a message indicating call rejection as a response to SRI to the GMSC 205. The call reject message may include information notifying PS-only-with-SMS subscription. At operation 235, a Send Routing Information Response message may be used. Another type message may also be used.

Upon reception of a negative response, at operation 240, not to retry paging, the GMSC 205 stops the paging retry timer.

At operation 245, the GMSC 205 sends a notification indicating failure of a voice call (CS service other than SMS) attempt to the sender network, which then notifies the sender (UE2 206) that the request for a CS service other than SMS (voice call) is denied because of recipient's PS-only-with-SMS subscription and an SMS service is available. The GMSC 205 may directly send such notification to the sender terminal 206, or may send such notification to a corresponding to MSC of the sender network and the MSC may forward the notification to the sender terminal 206 via RNC (BSC). The sender terminal 206 may store the received information or notify the user of the same. The sender terminal 206 may notify the user of the received information by means of sound output or screen output.

Figure 3:
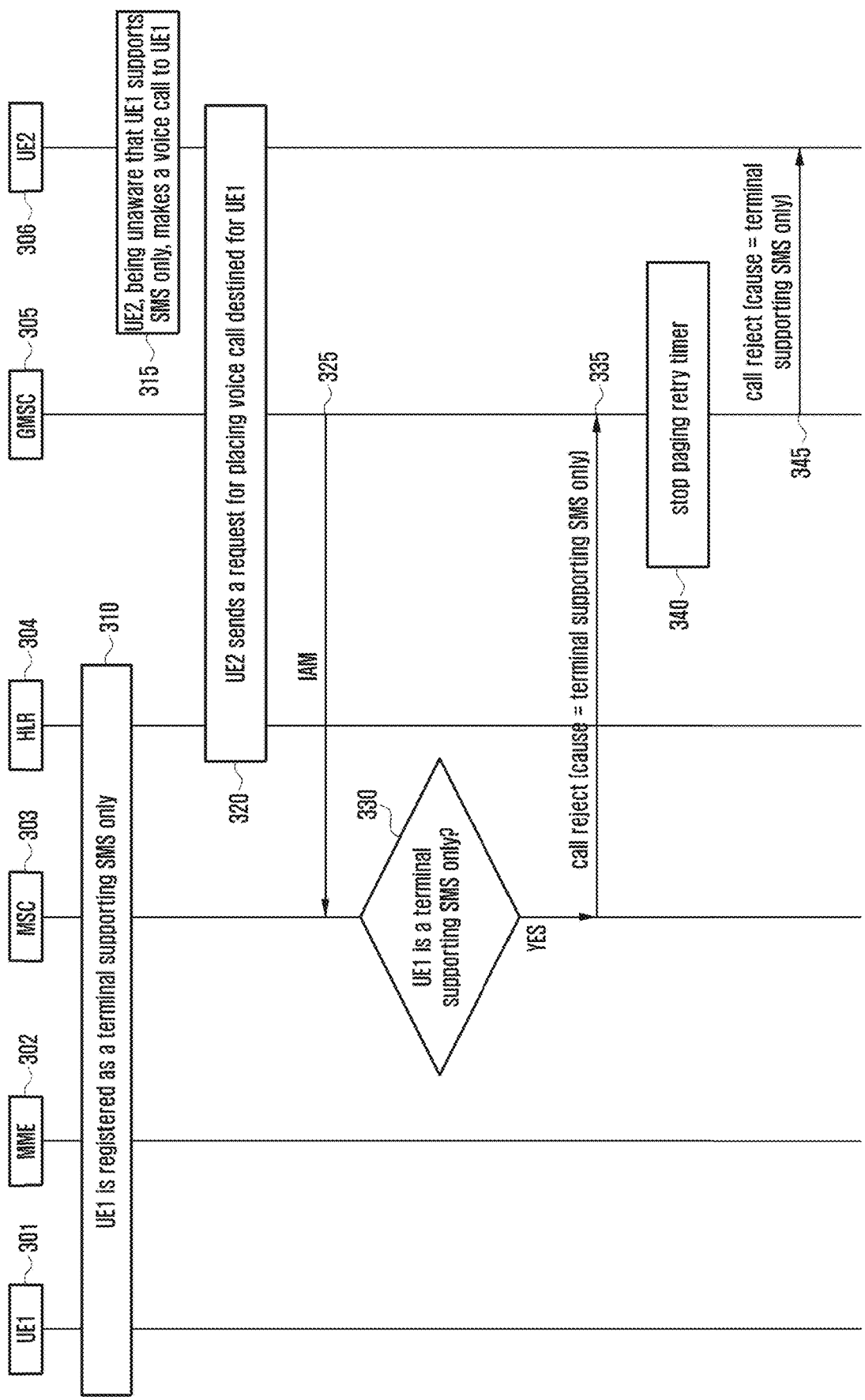
FIG. 3 illustrates another procedure for signal exchange according to the first embodiment.

FIG. 3 illustrates another procedure for signal exchange according to the first embodiment.

Referring to FIG. 3, at operation 310, a first user equipment (UE1) 301 is registered as a PS-only-with-SMS terminal in at least one of the MME 302, MSC 303 and HLR 304. Here, the UE1 301 registered as a PS-only-with-SMS terminal may receive only a PS data service or a SMS service.

At operation 315, a second user equipment (UE2) 306, being unaware that the UE1 301 is a PS-only-with-SMS terminal, makes a voice call to the UE1 301.

At operation 320, the UE2 306 sends a voice call request to the GMSC 305. At operation 325, the GMSC 305 transmits an IAM message to the MSC 303 at which the UE1 301 is located. The IAM message may include a service indicator indicating the requested service (voice call or SMS, or CS service other than SMS).

At operation 330, the MSC 303 checks whether the request destined for the UE1 301 is SMS. If the request destined for the UE1 301 is SMS, the MSC 303 sends a paging request to the MME 302 in which the UE1 301 is registered. If the request destined for the UE1 301 is a CS service (e.g. voice call), at operation 335, the MSC 303 sends a message indicating that the UE1 301 is registered as a PS-only-with-SMS terminal to the GMSC 305. Here, this message may be a call reject message, which may include a cause of rejection. At operation 335, the MSC 303 may use an RCH message or another type message to notify that the UE1 301 is registered as PS-only-with-SMS.

After reception of a negative response, the GMSC 305 performs operation 340 and operation 345, which are identical respectively to operation 240 and operation 245 in FIG. 2.

Figure 4:
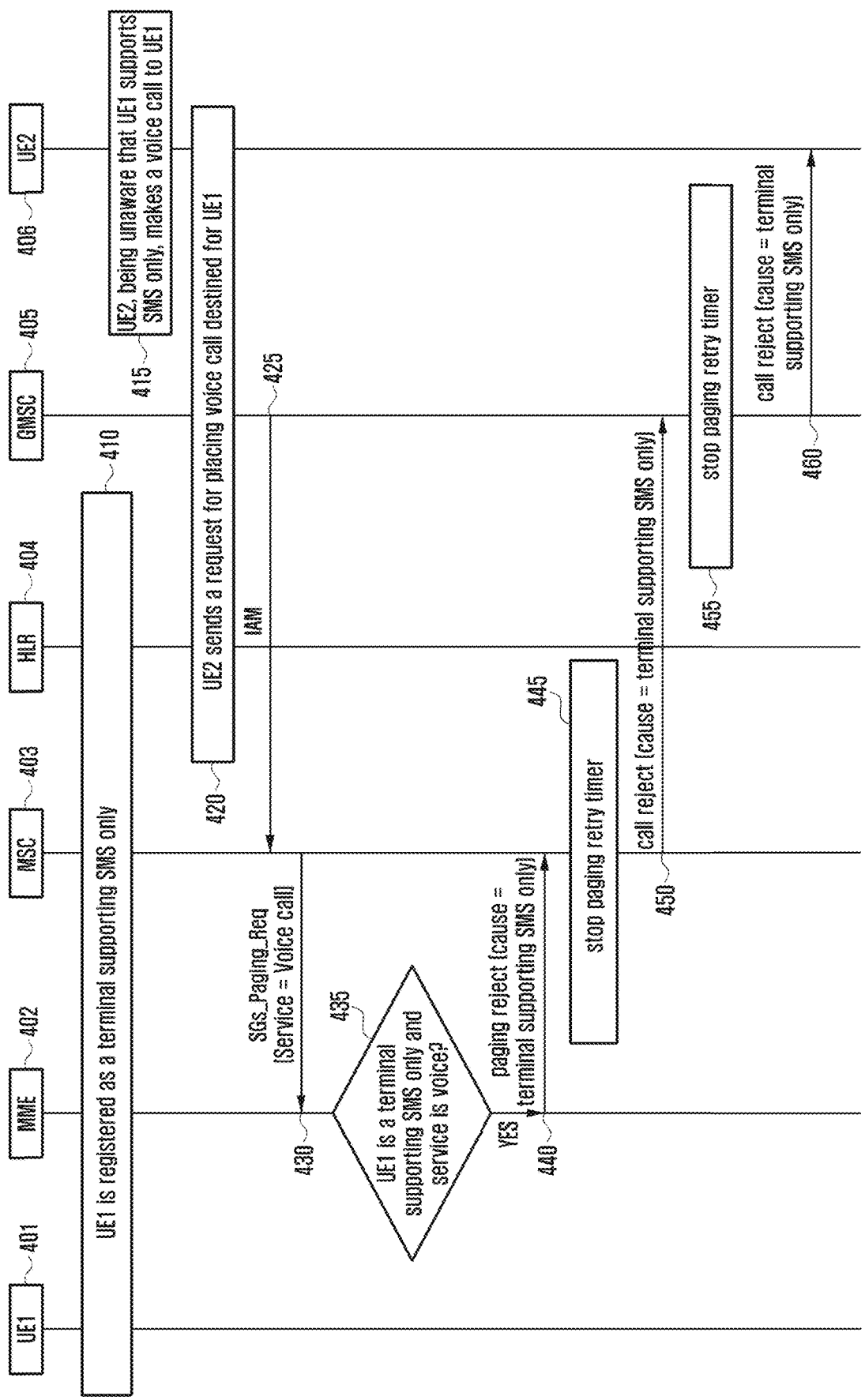
FIG. 4 illustrates still another procedure for signal exchange according to the first embodiment.

FIG. 4 illustrates another procedure for signal exchange according to the first embodiment.

At operation 410, a first user equipment (UE1) 401 is registered as a PS-only-with-SMS terminal in at least one of the MME 402, MSC 403 and HLR 404. Here, the UE1 401 may receive only a PS data service or a SMS service.

At operation 415, a second user equipment (UE2) 406, being unaware that the UE1 401 has a PS-only-with-SMS subscription, makes a voice call to the UE1 401.

At operation 420, the UE2 406 sends a voice call request to the GMSC 405. At operation 425, the GMSC 405 transmits an IAM message to the MSC 403 at which the UE1 401 is located. The IAM message may include a service indicator indicating the requested service (voice call or SMS, or CS service other than SMS).

At operation 430, the MSC 403 sends a paging request message to the MME 402. Here, the paging request message may be a SGs_Paging_Req message, which may include an indicator to a service to be provided by paging.

At operation 435, the MME 402 checks whether the request destined for the UE1 401 is SMS. If the request destined for the UE1 401 is SMS, the MME 402 may perform further processing.

If the request destined for the UE1 401 is a CS service other than SMS (e.g. voice call), at operation 440, the MME 402 sends a message indicating that the UE1 401 is registered as a PS-only-with-SMS terminal to the MSC 403. Here, this message may be a paging reject message, which may include a cause of rejection. The MME 402 may also use a SGs paging reject message or another type message.

Upon reception of a negative response such as paging reject, at operation 445, not to retry paging, the MSC 403 stops the paging retry timer.

At operation 450, the MSC 403 notifies the GMSC 405 of voice call rejection. Here, a call reject message including a cause of rejection may be sent to the GMSC 405 to notify the sender network of failure of a voice call attempt.

Thereafter, operation 455 and operation 460 in the sender network are performed in a manner identical respectively to operation 240 and operation 245 in FIG. 2.

Second Embodiment

When a user equipment wishes to receive an emergency service, generation of an emergency bearer rather than a normal bearer is needed. In most cases, a typical normal bearer cannot be converted to an emergency bearer. When a user requests an emergency service, the operator network must set up an emergency call within a time duration set by local or government regulations.

Meanwhile, the maximum number of simultaneously activatable bearers in a user equipment may be limited according to implementation. Typical user equipments may simultaneously activate up to one, three or five bearers. In a user equipment, the number of simultaneously active bearers may exceed the maximum number of bearers supportable by the user equipment when an emergency call is placed in a state wherein the number of normal bearers currently active for system attachment has reached the maximum number of supportable bearers, or when multiple bearers needed to provide an emergency service are simultaneously created (for example, while the maximum number of supportable bearers is three, the number of active normal bearers is two and the number of emergency bearers needed is two). In this case, for emergency service provisioning, it is necessary to release normal bearers and create emergency bearers.

In consideration of the maximum number of supportable bearers, the number of currently active normal bearers, and the number of bearers needed for an emergency call or service, the user equipment may perform normal bearer cleanup first and then perform emergency bearer setup, or may simultaneously issue an emergency bearer setup request and a normal bearer cleanup request.

That is, when an emergency service is needed, the user equipment may send a normal bearer deactivation request to the network, or may locally deactivate normal bearers and notify the core network of a bearer context state through TAU. In the event that the core network (e.g. MME) is aware of the maximum number of bearers supportable by a user equipment, when the user equipment issues an emergency bearer creation request, the core network may automatically perform normal bearer cleanup for the user equipment. More specifically, the following schemes may be used.

Figure 5:
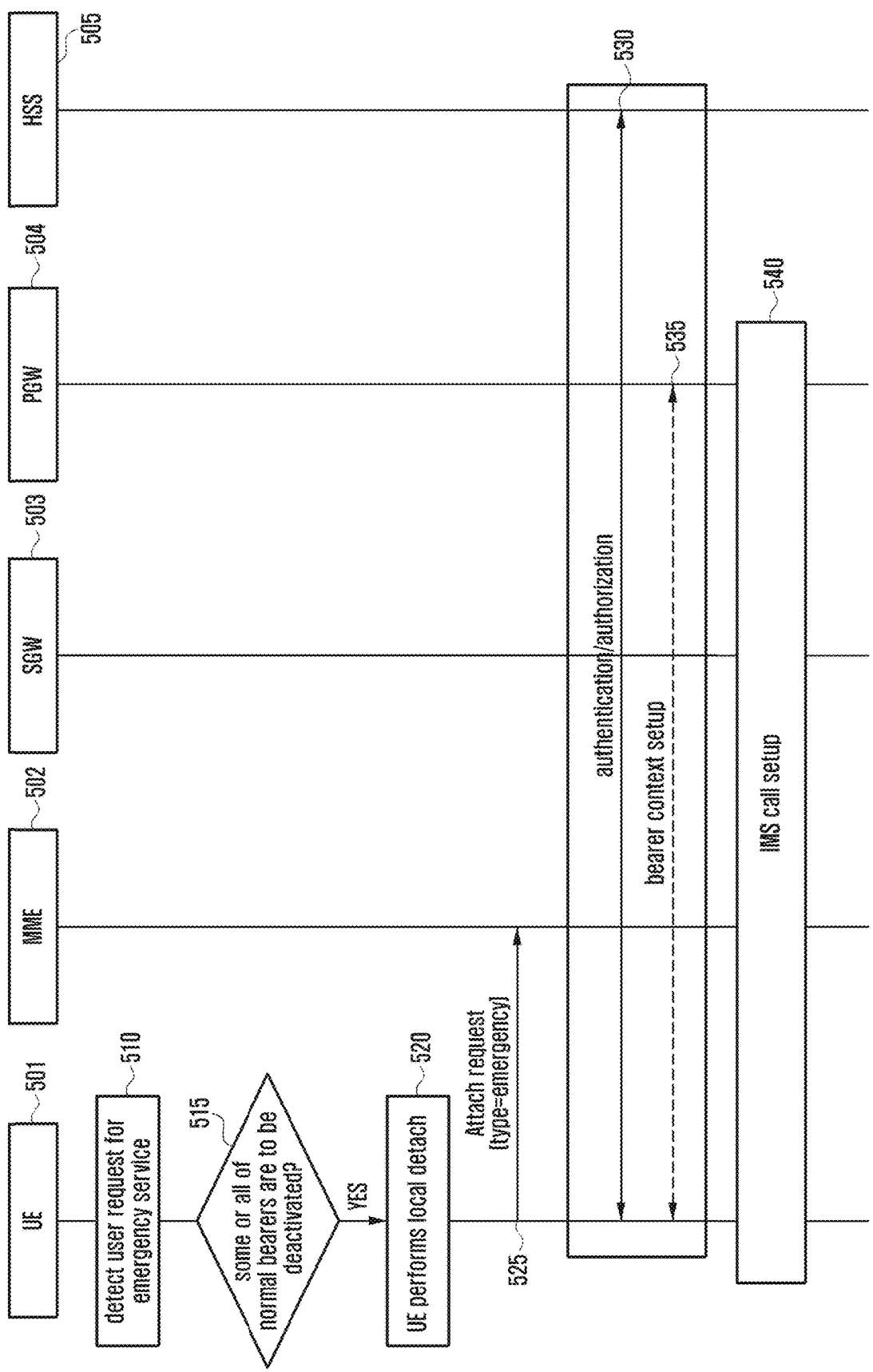
FIG. 5 illustrates a procedure for signal exchange according to a second embodiment.

FIG. 5 illustrates a procedure for signal exchange according to the second embodiment.

Specifically, FIG. 5 depicts emergency service provisioning through the attach procedure.

Referring to FIG. 5, in the second embodiment, a UE 501 may exchange signals with a network composed of the MME 502, S-GW 503, P-GW 504 and HSS 505. The UE 501 may exchange signals with the network via a base station (ENB).

At operation 510, the UE 501 detects a user request for an emergency service.

At operation 515, the UE 501 identifies the number of currently active bearers. Here, the number of currently active bearers may be the number of normal bearers. The UE 501 may determine whether some or all of the currently active bearers are to be deactivated on the basis of the number of currently active bearers, the number of bearers to be used for the emergency service, and the number of simultaneously supportable bearers. The UE 501 may determine that the number of simultaneously active bearers fails to accommodate the number of bearers to be used for the emergency service.

If there is no need to deactivate some or all of the currently active bearers, the UE 501 may exchange signals with the MME 502 to establish a call for the emergency service.

If some or all of the currently active normal bearers are to be deactivated, at operation 520, the UE 501 performs local detach. Here, the UE 501 may autonomously conduct the local detach procedure.

At operation 525, the UE 501 performs a re-attach procedure for the emergency service in cooperation with the MME 502. This procedure may be initiated by sending an attach request, and the attach request may include an indication to the service or call type.

Upon reception of the attach request from the UE 501, at operation 530 and at operation 535, the core network identifies emergency attach from the attach request, and performs cleanup of existing normal bearers and generation of emergency bearers by means of authentication and authorization, and bearer context setup.

As a result, at operation 540, an IMS call is set up between the UE 501 and the core network.

Figure 6:
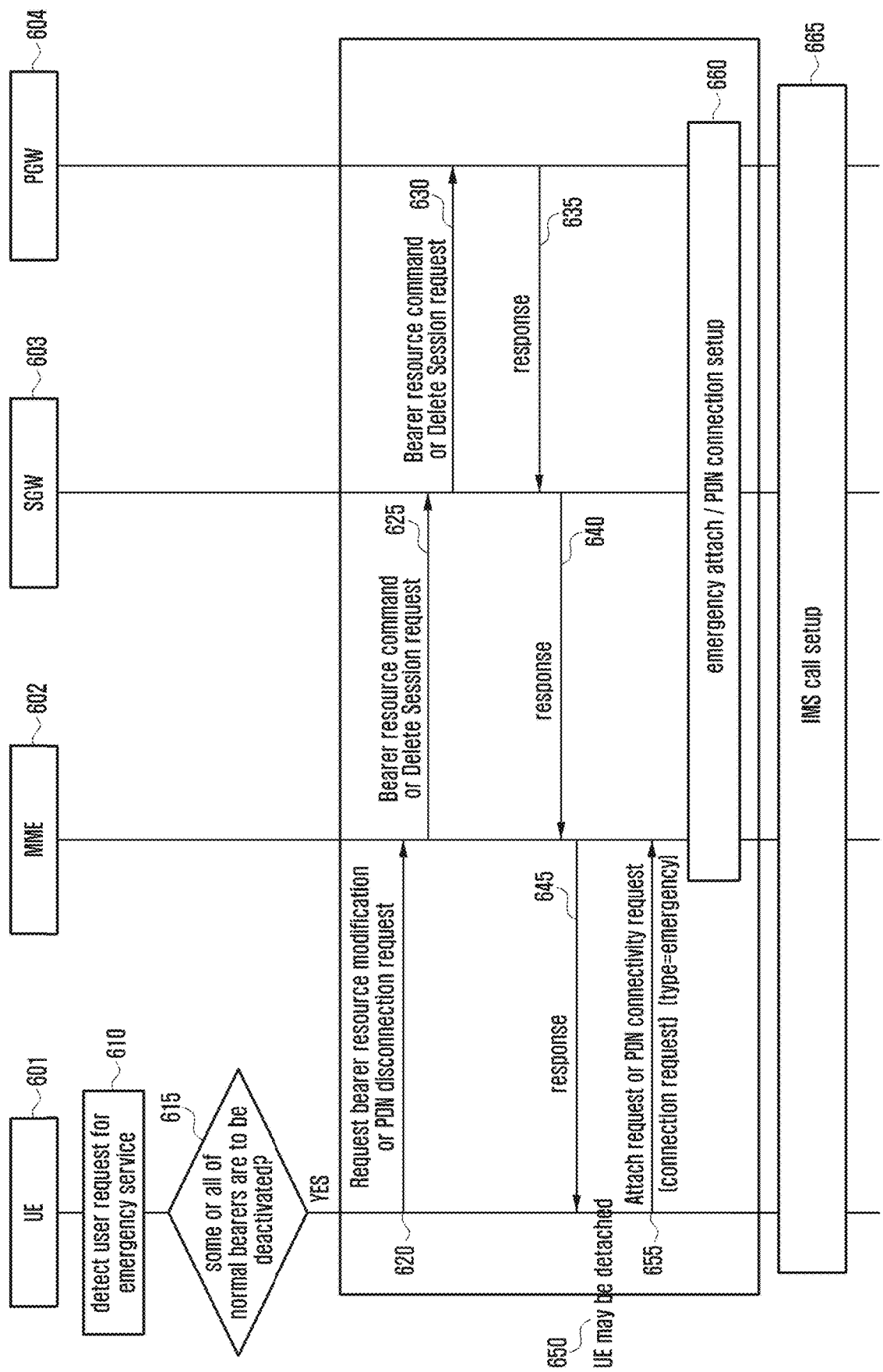
FIG. 6 illustrates another procedure for signal exchange according to the second embodiment.

FIG. 6 illustrates another procedure for signal exchange according to the second embodiment.

Specifically, FIG. 6 depicts a scheme in which the user equipment explicitly makes a normal bearer cleanup request.

Referring to FIG. 6, a UE 601 may exchange signals with a network composed of the MME 602, S-GW 603 and P-GW 604. The UE 601 may exchange signals with the network via a base station (ENB).

At operation 610, the UE 601 detects a user request for an emergency service.

At operation 615, the UE 601 identifies the number of currently active bearers. Here, the number of currently active bearers may be the number of normal bearers. The UE 601 may determine whether some or all of the currently active bearers are to be deactivated on the basis of the number of currently active bearers, the number of bearers to be used for the emergency service, and the number of simultaneously supportable bearers. The UE 601 may determine that the number of simultaneously active bearers fails to accommodate the number of bearers to be used for the emergency service.

If there is no need to deactivate some or all of the currently active bearers, the UE 601 may exchange signals with the MME 602 to establish a call for the emergency service.

If it is not possible to accommodate the number of bearers to be used for the emergency service owing to the number of simultaneously active bearers, at operation 620, the UE 601 sends a request for releasing a normal bearer or normal PDN connection to the core network. Here, this request may be sent to the MME 602 through a bearer resource modification request or PDN disconnection request.

Upon reception of the request, at operation 625, the MME 602 forwards the received request to the S-GW 603 through a bearer resource command or a delete session request.

Upon reception of the request, at operation 630, the S-GW 603 forwards the received request to the P-GW 605 through a bearer resource command or a delete session request.

At operations 635 to 645, a response to the request is sent by the P-GW 604 via the S-GW 603 and the MME 602 to the UE 601.

As a result, at operation 650, the UE 601 may be detached.

At operation 655, the UE 601 sends an Attach request or PDN connectivity request to the MME 602. This request may include type information indicating "emergency". At operation 655, an emergency PDN connectivity request may be sent. In the event that all bearers have been released, as the UE 601 is detached, an emergency attach request may be sent.

At operation 660, at least one of the emergency attach procedure and the emergency PDN connection procedure may be performed. At operation 665, an IMS call is set up.

Meanwhile, in another embodiment of the present disclosure, for an emergency service, the UE 601 may locally deactivate existing bearers and notify the core network of this deactivation through a TAU procedure. More specifically, in response to a user request for an emergency service, when some or all of existing bearers are to be deactivated, the UE 601 selects bearers to be deactivated and sends a TAU request message containing information on the remaining active EPS bearers (except for the selected bearers) to the core network (active bits of the EPS bearer context status are set in the TAU request message). The UE 601 may also send a TAU request message containing bearer information (bearers to be deactivated are marked as inactive and bearers to be kept are marked as active) to the core network. Here, the UE 601 may notify the core network of the emergency service request by setting the EPS update type of the TAU request. The UE 601 may notify the core network of the emergency service request by using an additional update type of the TAU request. The UE 601 may also notify the core network of the emergency service request by using a separate emergency indicator of the TAU request. In addition, the UE 601 may notify the core network of S1/S5 setup for the following emergency service by setting the active flag of the TAU request.

Thereby, the MME 602 may be aware that the UE 601 has changed the bearer context for the emergency service. The MME 602 compares the pre-stored EPS bearer context status with the EPS bearer context status in the TAU request received from the UE 601 and may perform bearer cleanup if an EPS bearer to be deactivated is present.

When the UE 601 has sent a TAU request for an emergency service, to allow the UE 601 to promptly send a subsequent emergency service request (PDN connectivity request), the MME 602 may send a TAU accept response to the UE 601 before completion of bearer cleanup.

Upon reception of a TAU accept response, the UE 601 may be aware of completion of requested bearer context status update, and may perform a subsequent procedure for the emergency service.

As another embodiment, when bearer cleanup for an emergency service is needed during idle mode, the following scheme may be applied.

If some or all of existing bearers are to be deactivated for the emergency service, the UE 601 selects bearers to be deactivated and sends a TAU request containing information on the remaining active EPS bearers (except for the selected bearers) to the core network (active bits of the EPS bearer context status are set in the TAU request message). The UE 601 may also send a TAU request message containing bearer information (bearers to be deactivated are marked as inactive and bearers to be kept are marked as active) to the core network. To send a TAU request in idle mode, the UE 601 has to establish an RRC connection with the ENB. The UE 601 may send an RRC connection setup request whose establishment cause is set to "emergency".

The ENB forwards the TAU request message contained in an RRC message received from the UE 601 through S1-AP Initial UE message. When the RRC establishment cause is set to "emergency", the ENB may forward this together with the TAU request message.

Upon reception of the TAU request message with RRC establishment cause set to "emergency", the MME 602 may be aware that the UE 601 has sent the TAU request for an emergency service. Thereafter, subsequent operations may be processed as described before.

In the above two embodiments, the UE 601 is depicted as notifying the network of information on locally deactivated bearers using a TAU message. The same procedure may be applied to 2G/3G networks using a Routing Area Update (RAU) message. Alternatively, the UE 601 may send an Extended Service Request (ESR) message having bearer status information instead of a TAU message having bearer status information.

The schemes described above may be readily applied without significant modification to existing systems and may be further enhanced so that requested emergency services can be provided to users as rapidly as possible.

Figure 7:
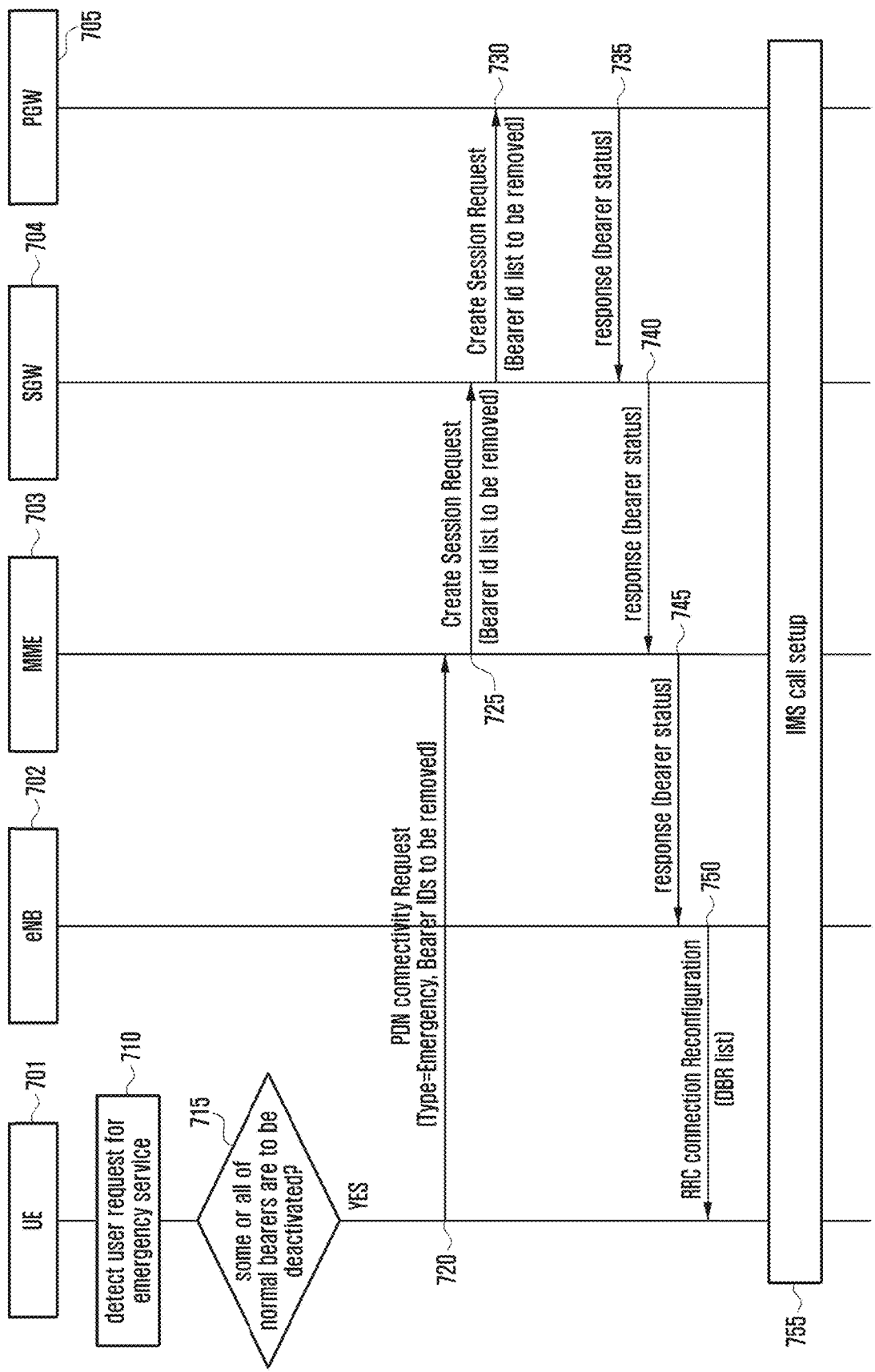
FIG. 7 illustrates still another procedure for signal exchange according to the second embodiment.

FIG. 7 illustrates another procedure for signal exchange according to the second embodiment.

Specifically, FIG. 7 depicts a signal exchange scheme in which cleanup of existing bearers and creation of new emergency bearers are simultaneously performed.

Referring to FIG. 7, a UE 701 may exchange signals with a network composed of the ENB 702, MME 703, S-GW 704 and P-GW 705.

At operation 710, the UE 701 detects a user request for an emergency service.

At operation 715, the UE 701 identifies the number of currently active bearers. Here, the number of currently active bearers may be the number of normal bearers. The UE 701 may determine whether some or all of the currently active bearers are to be deactivated on the basis of the number of currently active bearers, the number of bearers to be used for the emergency service, and the number of simultaneously supportable bearers. The UE 701 may determine that the number of simultaneously active bearers fails to accommodate the number of bearers to be used for the emergency service.

If there is no need to deactivate some or all of the currently active bearers, the UE 701 may exchange signals with the MME 703 to establish a call for the emergency service.

If some or all of the currently active bearers are to be deactivated to provide the emergency service for the emergency call from the user, at operation 720, the UE 701 selects bearers to be deactivated and sends a PDN connectivity request message containing information on the remaining active EPS bearers (except for the selected bearers) to the MME 703 (active bits of the EPS bearer context status are set in the PDN connectivity request message). The UE 701 may also send a PDN connectivity request message containing bearer information (bearers to be deactivated are marked as inactive and bearers to be kept are marked as active) to the MME 703. The UE 701 may select bearers to be removed according to a criteria based on ARP, QCI, default/dedicated bearer (a dedicated bearer is removed), or inactivity duration.

Thereby, at operation 720, the MME 703 may be aware that the UE 701 has changed the bearer context for the emergency service. The MME 703 compares the pre-stored EPS bearer context status with the EPS bearer context status in the PDN connectivity request received from the UE 701 and may perform bearer cleanup if an EPS bearer to be deactivated is present. The MME 602 may also perform bearer cleanup on the basis of information received at operation 715. In addition, the MME 703 may perform a PDN connection creation procedure for the emergency service.

At operation 725, the MME 703 sends a Create Session Request to the S-GW 704. This Create Session Request may contain IDs of bearers to be removed.

At operation 730, the S-GW 704 forwards the Create Session Request received at operation 725 to the P-GW 705.

At operations 735 to 745, each node sends or forwards a response message. At operation 750, the ENB 702 may send an RRC connection Reconfiguration to the UE 701. This RRC connection Reconfiguration may contain a DBR list.

At operation 755, an IMS call is set up between the UE 701 and core network.

Figure 8:
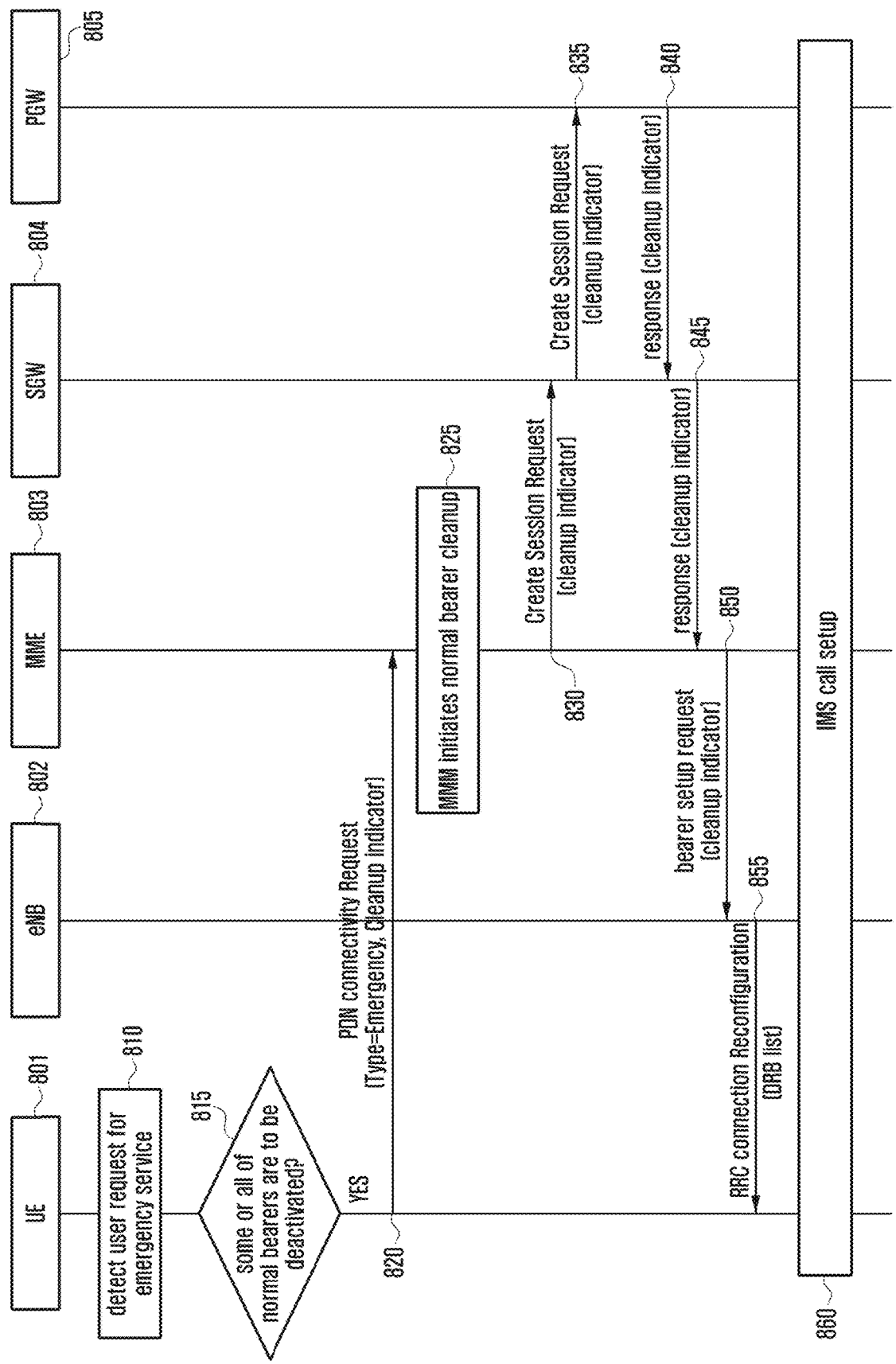
FIG. 8 illustrates yet another procedure for signal exchange according to the second embodiment.

FIG. 8 illustrates another procedure for signal exchange according to the second embodiment.

Specifically, in FIG. 8, a UE 801 requests the network to clean up existing normal bearers and to create bearers for an emergency service.

Referring to FIG. 8, the UE 601 may exchange signals with a network composed of the ENB 802, MME 803, S-GW 804 and P-GW 805.

Operation 810 and operation 815 are identical respectively to operation 710 and operation 715 in FIG. 7.

If it is not possible to accommodate the number of bearers to be used for the emergency call placed by the user owing to the number of simultaneously active bearers, at operation 820, the UE 801 sends an Emergency PDN connectivity request containing a cleanup indicator to existing bearers. This request may also include information on the number of bearers simultaneously supportable by the UE 801.

At operation 825, in the case wherein the maximum number of simultaneously activatable bearers in the UE 801 is known to the core network in advance when the UE 801 has issued an emergency service request, the MME 803 may autonomously perform bearer cleanup. In the case wherein the number of supportable bearers in the UE 801 is not known to the core network when the UE 801 has issued a bearer cleanup request, the MME 803 may simply remove all normal bearers.

The MME 803 may be aware of the maximum number of simultaneously supportable bearers in the UE 801 according to user subscription information. The context table in the UE 801 may have a mapping to the maximum number of supportable bearers based on ISMI, or the maximum number of active bearers may be known according to the model of the UE 801 based on IMEISV. In this case, the MME 803 may have to store mappings for UE models based on IEMISV and the maximum number of active bearers in each UE model.

To notify the MME 803 of such information, the operator may update UE information in the HSS or may set information on the IMEISV-based model of the UE 801 and the maximum number of bearers corresponding to the model in the MME 803 through O&M configuration or the like.

Upon reception of the emergency PDN connectivity request from the UE 801, the MME 803 may determine that some or all of normal bearers are to be removed on the basis of information on the UE 801 and the maximum number of supportable bearers. When only some of normal bearers are to be removed, selection of bearers to be removed may be performed according to a criteria based on ARP, QCI, default/dedicated bearer (a dedicated bearer is removed), or inactivity duration.

At operations 830 and 835, the core network removes corresponding active normal bearers (bearer cleanup from the S-GW 804 to the P-GW 805) and creates emergency bearers/sessions. Here, cleanup of existing bearers and creation of new emergency bearers may be simultaneously performed or separately performed in sequence. For simultaneous performance, a list of bearers to be removed or a cleanup indicator indicating removal of all normal bearers may be inserted in the Create session request message for emergency bearer creation.

The MME 803 notifies the ENB 802 of information on removed bearers and newly created bearers (bearer ID, bearer QoS, S5 TEID or the like). The ENB 802 updates data radio bearers related to the UE 801 accordingly.

When IDs of bearers to be removed are included in the emergency PDN connectivity request, the core network may remove the indicated active normal bearers (bearer cleanup from the S-GW 804 to the P-GW 805) and perform emergency bearer/session creation.

Here, cleanup of existing bearers and creation of new emergency bearers may be simultaneously performed or separately performed in sequence. For simultaneous performance, a list of bearers to be removed or a cleanup indicator indicating removal of all normal bearers may be inserted in the Create session request message for emergency bearer creation.

The MME 803 notifies the ENB 802 of information on removed bearers and newly created bearers (bearer ID, bearer QoS, S5 TEID or the like). The ENB 802 updates data radio bearers related to the UE 801 accordingly. Finally, this update is known to the UE 801.

In another embodiment of the present disclosure, merging of the EMM process and the ESM process is proposed. That is, a TAU/RAU request message or ESR message containing an ESM message container is transmitted. Here, an ESM request message (e.g. PDN connectivity request) created by the UE 801 may be contained in the ESM message container.

More specifically, upon emergency service initiation, the UE 801 sends information on locally deactivated bearers through a TAU/RAU request message or an ESR message, whose ESM message container includes a PDN connectivity request. In other words, the UE 801 inserts information on locally deactivated bearers or information on the remaining active bearers after deactivation in the EPS bearer context status IE of a TAU request, RAU request or ESR message, inserts a PDN connectivity request for the emergency service in the ESM message container thereof, and sends the TAU request, RAU request or ESR message to the MME 803. The MME 803 may not only perform bearer cleanup for the UE 801 according to the above embodiments but also handle a PDN connection creation request using the PDN connectivity request contained in the ESM message container. In the above-described schemes for emergency call provisioning according to the second embodiment, information elements contained in each signal may be used interchangeably.

Third Embodiment

When a core network node (e.g. MME or SGSN) becomes congested owing to heavy signaling load, the core network node may redirect user equipments being served so that the user equipments can be served by another core network node.

This process may be realized through a procedure performed by a base station node to newly select a core network node for a user equipment and through a procedure to register UE information in the core network node. However, if the previous core network node in congestion is reselected by the base station node performing the core network node selection procedure, congestion may be not resolved. In addition, when the core network node serving a user equipment is changed after a new core network node is selected by the base station node, it is necessary to register UE information in the new core network node. Here, to obtain information on the user equipment stored in the previous core network node, making an information request to the previous core network node may exacerbate conditions of the previous core network node already in congestion.

In this embodiment, a core network node in congestion may notify a user equipment of difficulty of service provisioning owing to congestion through NAS layer information. Upon reception of such notification, the user equipment does not provide information enabling identification of the previous core network node (e.g. S-TMSI, GUTI, GUMMEI, or P-TMSI) to the lower layer (AS layer) during reconfiguration of core network registration. Without information on the previous core network node, the AS layer of the user equipment cannot provide information thereon when an RRC connection is established with the base station, causing the base station to select a new core network node for the user equipment. A NAS request message (e.g. attach request) from the user equipment is delivered to the newly selected core network node via the base station. Here, to prevent exacerbation of congestion that may be caused by the new core network node trying to obtain UE context information from the previous core network node, the user equipment may provide the new core network node with information (or indicator) that directs the new core network node to directly communicate with the HSS to thereby configure UE context information.

Figure 9:
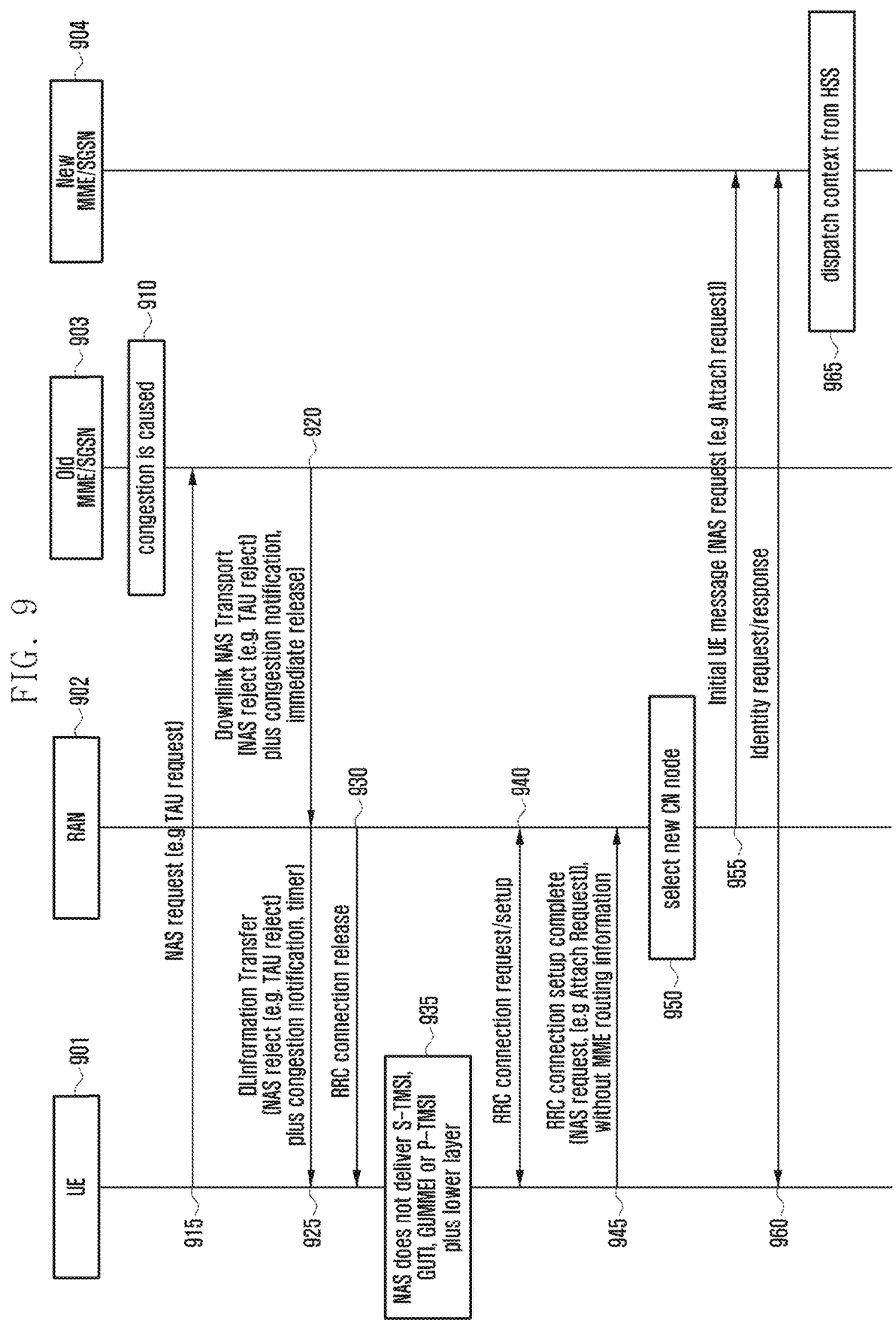
FIG. 9 illustrates a procedure for signal exchange according to a third embodiment.

FIG. 9 illustrates a procedure for signal exchange according to the third embodiment.

Referring to FIG. 9, a UE 901 may exchange signals with the MME/SGSN 903 or 904 via the RAN 902. Here, in terms of congestion, the MME/SGSN 903 or 904 may be referred to as old MME/SGSN 903 (to which a connection has been made) or referred to as new MME/SGSN 904 (to which a connection will be made). However, it should be evident that change of the MME/SGSN may also be triggered by a cause other than congestion.

At operation 910, congestion is generated in the old MME/SGSN 903. Congestion may be caused by an increase in traffic, operational failure of some devices or the like.

As shown, at operation 915, the UE 901 sends a NAS request message (e.g. TAU request or attach request) to a core network node in congestion (referred to as old core network node). At operation 920, the old core network node sends an NAS response or reject message (e.g. TAU reject or attach reject) together with information indicating rejection of the request owing to congestion or indicating necessity of UE re-registration as loaded state to the UE 901. Here, the S1-AP message (Downlink NAS Transport), which encapsulates the NAS message and is sent to the RAN 902 (base station), may further include information indicating necessity of releasing an RRC connection between the UE 901 and RAN 902 after delivery of the NAS message (e.g. immediate release required indicator).

At operation 925, the RAN 902 sends an RRC message (DLInformationTransfer), which contains the message received from the core network node, to the UE 901. The RRC message may contain a congestion notification and timer information.

Upon reception of a request for immediate release of the RRC connection, at operation 930, the RRC connection is immediately released after message delivery. The RRC connection is released because, as the RAN 902 reselects a core network node for the UE 901 during RRC connection setup, if an existing RRC connection is reused when the UE 901 makes a NAS request, the old core network node may be reused.

As a scheme to obtain similar effects, a timer value may be inserted in a NAS response/reject message sent by the core network node to the UE 901 or in an RRC message (DLInformationTransfer) sent by the RAN 902 to the UE 901. This timer value acts as a protection interval needed by the RAN 902 to release an existing RRC connection. That is, when a timer value is received through a core network node or an RRC message, the UE 901 may make a NAS request after expiration of the corresponding timer.

Thereafter, at operation 935, when a NAS request (Attach request) is made, the NAS layer of the UE 901 prevents delivery of information enabling identification of the old core network node (e.g. S-TMSI, GUTI, GUMMEI or P-TMSI) to the lower layer.

At operation 940, RRC connection request/setup are performed. At operation 945, during RRC connection setup, the AS layer of the UE 901 does not send information enabling identification of the old core network node (e.g. MME routing information) to the RAN 902.

At operation 945, the RAN 902 receives an RRC connection setup complete message. At operation 950, as information enabling identification of the old core network node is not present, the RAN 902 selects a new core network node. At operation 955, the RAN 902 forwards the contained NAS request message to the new core network node.

Upon reception of the NAS request message for the UE 901, the new core network node has to perform a procedure for obtaining context information of the UE 901. Here, the new core network node may send a request for context information of the UE 901 to the old core network node if necessary by use of an identifier (GUTI, or old GUTI) inserted by the UE 901 in the NAS request message. However, when many such requests are concentrated in the old core network node in congestion, congestion may worsen. To solve this problem, 1) when congestion arise, the old core network node may notify the new core network node of the congestion state through message exchange between core network nodes such as overload indication, or 2) when the new core network node sends an identification request for context information, the old core network node may notify the new core network node of the congestion state through a response/rejection to the request. Upon reception of the notification, the new core network node may be aware that the old core network node is overloaded and may store the notification for later use. At operation 960, the core network performs a procedure of identity request/response to obtain the IMSI of the UE 901. At operation 965, the core network receives the IMSI from the UE 901 and performs UE context setup and necessary registration using the received IMSI.

Figure 10:
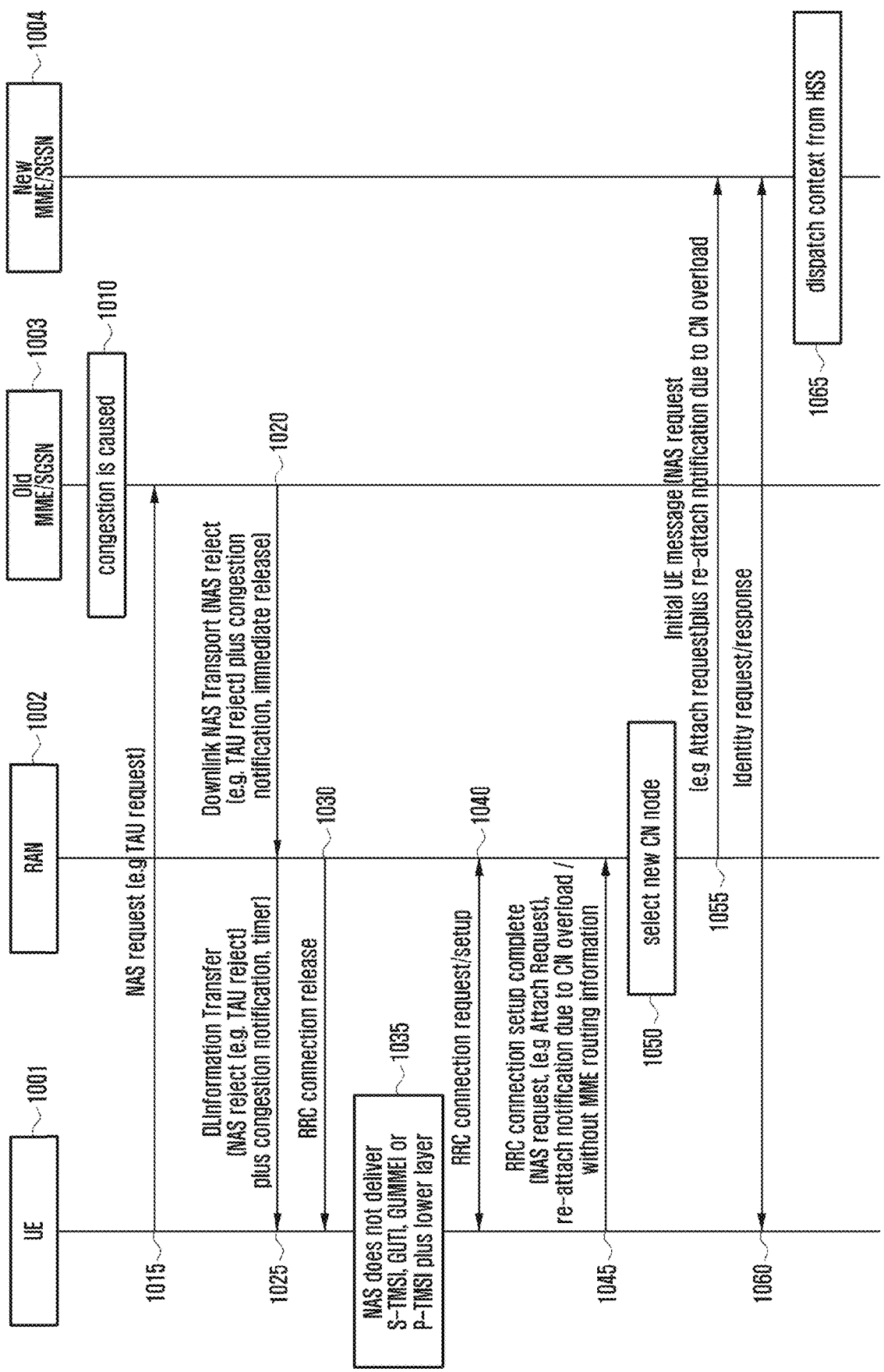
FIG. 10 illustrates another procedure for signal exchange according to the third embodiment.

FIG. 10 illustrates another procedure for signal exchange according to the third embodiment.

Referring to FIG. 10, a UE 1001 may exchange signals with the MME/SGSN 1003 or 1004 via the RAN 1002. Here, in terms of congestion, the MME/SGSN 1003 or 1004 may be referred to as old MME/SGSN 1003 (to which a connection has been made) or referred to as new MME/SGSN 1004 (to which a connection will be made). However, it should be evident that change of the MME/SGSN may also be triggered by a cause other than congestion.

Operations 1010 to 1040 correspond respectively to operations 910 to 940 in FIG. 9.

At operation 1045, the UE 1001 generates a NAS request (attach request) containing an indication to overload of the old core network node or to preference for core network change at the NAS layer and sends the NAS request to the RAN 1002 (base station). At operation 1050, the RAN 1002 selects a new core network node (MME/SGSN 1004) and sends an Initial UE message to the MME/SGSN 1004. Here, the Initial UE message may contain an indication notifying re-attachment due to core network overload. Upon reception of the NAS request message for the UE 1001, at operation 1060, the new core network node has to perform a procedure for obtaining context information of the UE 1001. When cause information (overload of the old core network node or preference for core network change) is included, the new core network node may be aware that the old core network node is overloaded and may store the notification for later use. If necessary, the new core network node may perform a procedure of identity request/response to obtain the IMSI of the UE 1001. At operation 1065, the core network receives the IMSI from the UE 1001 and performs UE context setup and necessary registration using the received IMSI.

Figure 11:
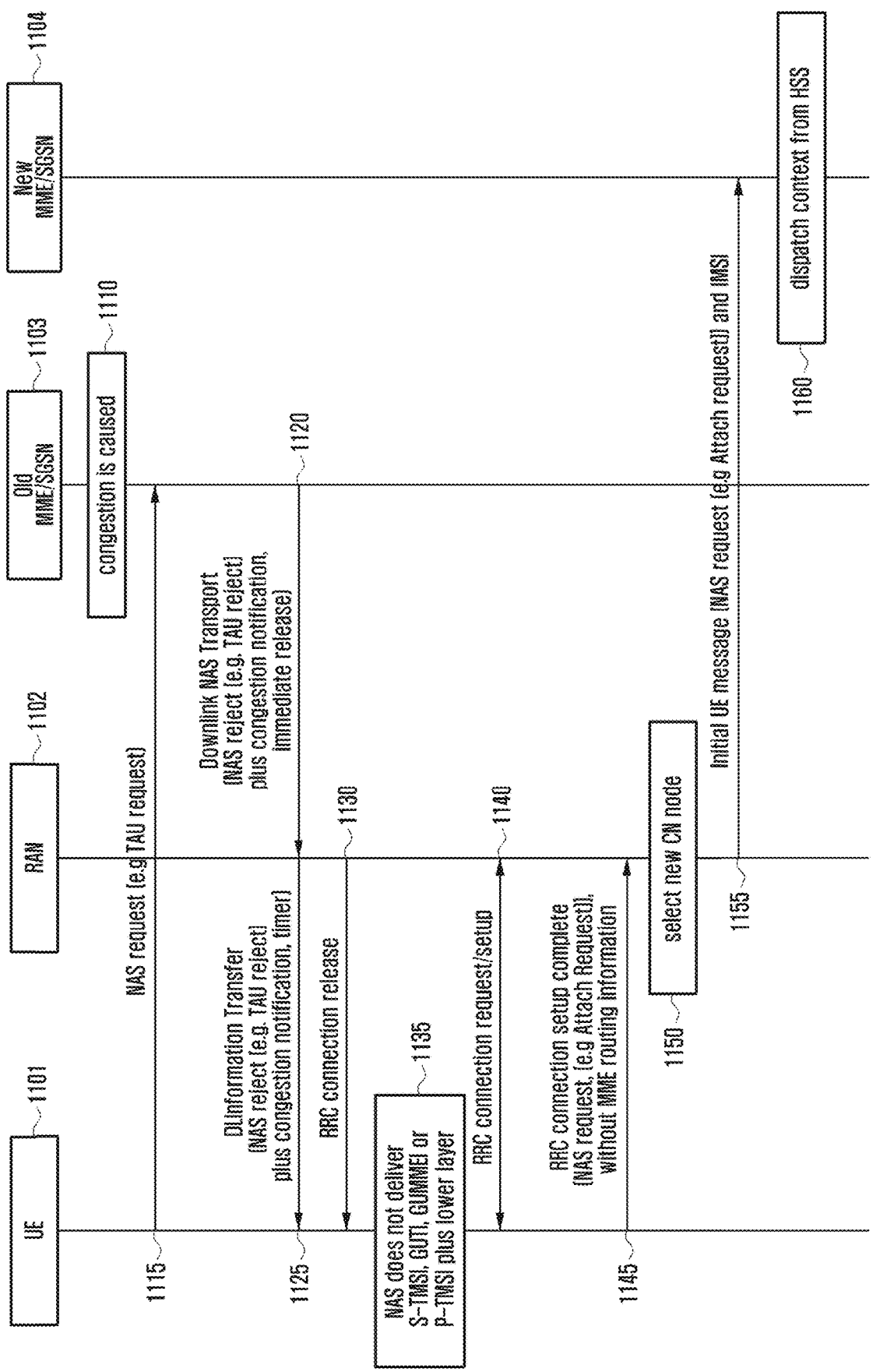
FIG. 11 illustrates still another procedure for signal exchange according to the third embodiment.

FIG. 11 illustrates another procedure for signal exchange according to the third embodiment.

Referring to FIG. 11, a UE 1101 may exchange signals with the MME/SGSN 1103 or 1104 via the RAN 1102. Here, in terms of congestion, the MME/SGSN 1103 or 1104 may be referred to as old MME/SGSN 1103 (to which a connection has been made) or referred to as new MME/SGSN 1104 (to which a connection will be made). However, it should be evident that change of the MME/SGSN may also be triggered by a cause other than congestion.

Operations 1110 to 1150 correspond respectively to operations 910 to 950 in FIG. 9.

The UE 1101 generates a NAS request (attach request) containing IMSI as UE ID instead of GUTI or old GUTI at the NAS layer when the present NAS request is to be generated owing to overload of the old core network node or preference for core network change, and sends the NAS request. Thereby, the new core network node does not send a request for UE context information to the old core network node and may perform UE context setup for the UE 1101 and necessary registration on the basis of the IMSI.

At operation 1155, the RAN 1102 sends an Initial UE message containing the NAS request and IMSI of the UE 1101. At operation 1165, necessary registration is performed.

Figure 12:
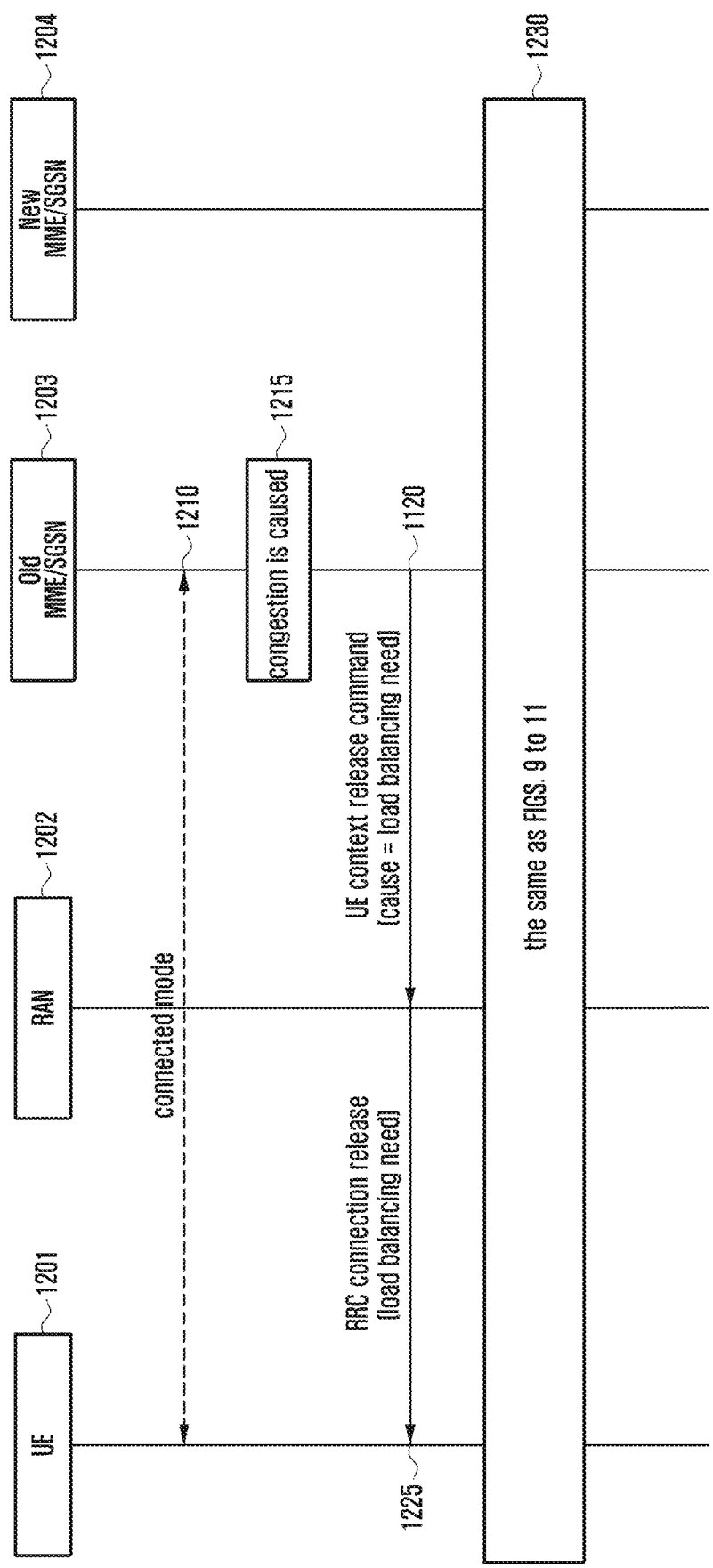
FIG. 12 illustrates yet another procedure for signal exchange according to the third embodiment.

FIG. 12 illustrates another procedure for signal exchange according to the third embodiment.

Referring to FIG. 12, a UE 1201 may exchange signals with the MME/SGSN 1203 or 1204 via the RAN 1202. Here, in terms of congestion, the MME/SGSN 1203 or 1204 may be referred to as old MME/SGSN 1203 (to which a connection has been made) or referred to as new MME/SGSN 1204 (to which a connection will be made). However, it should be evident that change of the MME/SGSN may also be triggered by a cause other than congestion.

While the embodiments described in FIGS. 9 to 11 are related to a case wherein the UE 1201 explicitly sends a NAS request to a core network node, the embodiment described in FIG. 12 may also be applied to a case wherein the UE 1201 does not explicitly send a NAS request. For example, upon determining that a core network node is overloaded, the UE 1201 is notified of necessity of core network node reconfiguration via the RAN 1202 and is registered through a new core network node using a procedure similar to those depicted in FIGS. 9 to 11. At operation 1210, the UE 1201, RAN 1202 and old MME/SGSN 1203 operate in connected mode.

At operation 1215, a core network node (old MME/SGSN 1203) detects overload. At operation 1220, the core network node sends a command message to the RAN 1202. Here, the command message contains information indicating necessity of connection release as to the UE 1201 for load balancing.

Upon reception of the command message, at operation 1225, the RAN 1202 sends an RRC connection release command indicating necessity of core network change for load balancing to the UE 1201. Operations after RRC connection release are similar to those after RRC connection release described in FIGS. 9 to 11, and a detailed description thereof is omitted.

The above description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A method performed by a terminal in a communication system, the method comprising:
   identifying a session associated with the terminal;
   determining whether the session associated with the terminal is needed to be released in order to request an emergency session; and
   in case that the session is needed to be released, performing a local release of the session or releasing the session via an explicit signaling,
   wherein a first message including information on a status of the session is transmitted to a core network entity, in case that the local release of the session is performed,
   wherein a second message including an identity of the session for requesting a releasing of the session is transmitted to the core network entity as the explicit signaling,
   wherein the information on the status of the session is set to inactive based on a result of the determination, and
   wherein the first message further includes information on a status of at least one other session set to not inactive.

2. The method of claim 1, wherein the first message includes a type element indicating that the terminal requests a registration with a network for an emergency service.

3. The method of claim 2, wherein the emergency session for the emergency service is established with the core network entity based on the first message.

4. A method performed by a core network entity in a communication system, the method comprising:
   identifying a session associated with a terminal;
   in case that the session is needed to be released for an emergency session, receiving, from the terminal, a first message including information on a status of the session based on a local release of the session or a second message including an identity of the session for requesting a releasing of the session as an explicit signaling for a release of the session;
   identifying that the session associated with the terminal is needed to be released in order to activate the emergency session based on the information; and
   releasing the session, in case that the session is needed to be released in order to activate the emergency session,
   wherein the information on the status of the session is set to inactive, and
   wherein the first message further includes information on a status of at least one other session set to not inactive.

5. The method of claim 4, wherein the first message includes a type element indicating that the terminal requests a registration with a network for an emergency service.

6. The method of claim 5,
   wherein the emergency session for the emergency service is established with the terminal based on the first message.

7. A terminal in a communication system, the terminal comprising:
   a transceiver; and
   a controller configured to:
      identify a session associated with the terminal,
      determine whether the session associated with the terminal is needed to be released in order to request an emergency session, and
      in case that the session is needed to be released, performing a local release of the session or releasing the session via an explicit signaling, wherein a first message including information on a status of the session is transmitted to a core network entity, in case that the local release of the session is performed, wherein a second message including an identity of the session for requesting a releasing of the session is transmitted to the core network entity as the explicit signaling, wherein the information on the status of the session is set to inactive based on a result of the determination, and wherein the first message further includes information on a status of at least one other session set to not inactive.

8. The terminal of claim 7, wherein the first message includes a type element indicating that the terminal requests a registration with a network for an emergency service.

9. The terminal of claim 8, wherein the emergency session for the emergency service is established with the core network entity based on the first message.

10. A core network entity in a communication system, the core network entity comprising:
a transceiver; and
a controller configured to:
identify a session associated with a terminal,
in case that the session is needed to be released for an emergency session, receive, from the terminal via the transceiver, a first message including information on a status of the session based on a local release of the session or a second message including an identity of the session for requesting a releasing of the session as a explicit signaling for a release of the session,
identify that the session associated with the terminal is needed to be released in order to activate the emergency session based on the information, and
release the session, in case that the session is needed to be released in order to activate the emergency session, wherein the information on the status of the session is set to inactive, and wherein the first message further includes information on a status of at least one other session set to not inactive.

11. The core network entity of claim 10, wherein the first message includes a type element indicating that the terminal requests a registration with a network for an emergency service.

12. The core network entity of claim 11, wherein the emergency session for the emergency service is established with the terminal based on the first message.

* * * * *